United States Patent [19]

Itakura et al.

[11] Patent Number: 5,491,512
[45] Date of Patent: Feb. 13, 1996

[54] SOLID STATE IMAGE SENSOR DEVICE AND ITS DRIVING METHOD

[75] Inventors: Keijirou Itakura; Toshihide Nobusada, both of Ibaraki; Yasuyuki Toyoda, Minou; Yukio Saitoh, Uji; Noboru Kokusenya, Osaka; Ryouichi Nagayoshi, Koube; Hironori Tanaka, Takatsuki; Masayoshi Ozaki, Amagasaki, all of Japan

[73] Assignee: Matsushita Electronics Corporation, Osaka, Japan

[21] Appl. No.: 416,437

[22] Filed: Mar. 31, 1995

Related U.S. Application Data

[63] Continuation of Ser. No. 169,001, Dec. 20, 1993, abandoned.

[30] Foreign Application Priority Data

Dec. 28, 1992 [JP] Japan .................................. 4-348108
Dec. 28, 1992 [JP] Japan .................................. 4-348109
Dec. 28, 1992 [JP] Japan .................................. 4-348110

[51] Int. Cl.$^6$ .............................. H04N 5/335; H04N 3/15
[52] U.S. Cl. .......................... 348/321; 348/311; 348/319; 348/445
[58] Field of Search .................................. 348/311, 314, 348/316, 321, 441, 445, 230; H04N 5/335, 3/15

[56] References Cited

U.S. PATENT DOCUMENTS 4,686,571  8/1987  Suzuki ...................................... 348/230

FOREIGN PATENT DOCUMENTS

| 0533092 | 3/1993 | European Pat. Off. | .......... H04N 5/76 |
| 0547697 | 6/1993 | European Pat. Off. | .......... H04N 3/15 |
| 4373276 | 12/1992 | Japan | .............................. H04N 5/335 |
| 5-37861 | 2/1993 | Japan | .............................. H04N 5/335 |

*Primary Examiner*—Joseph Mancuso
*Assistant Examiner*—Andrew B. Christensen
*Attorney, Agent, or Firm*—Willian Brinks Hofer Gilson & Lione

[57] ABSTRACT

A solid state image sensor comprising a matrix of photosensitive elements adapted to accumulate signal charges corresponding to at least two different aspect ratios, a plurality of vertical shift registers disposed adjacent to columns of the photosensitive elements for a vertical transfer of the signal charges and a plurality of horizontal shift registers corresponding to the respective aspect ratios and disposed in parallel with each other for a horizontal transfer of the signal charges from the vertical shift registers. As a horizontal shift register exclusive to each aspect ratio is provided in the above manner, it is no longer necessary to superimpose the signal outputs of a plurality of buffer amplifiers so that a picture signal corresponding to the desired aspect ratio can be easily read out.

6 Claims, 6 Drawing Sheets

SOLID STATE IMAGE SENSOR DEVICE AND ITS DRIVING METHOD

This is a continuation of application Ser. No. 08/169,001 filed Dec. 20, 1993 now abandoned.

FIELD OF THE INVENTION

The present invention relates to a solid state image sensor compatible with a plurality of aspect ratios (dissimilar vertical-to-horizontal dimensional ratios of the television picture frame) and to a method of driving the image sensor.

BACKGROUND OF THE INVENTION

A television system with an aspect ratio of 16:9, i.e. a picture frame with a relatively greater horizontal dimension than the existing frame with an aspect ratio of 4:3, is now being implemented commercially and some solid image sensors compatible with both systems have been developed.

An exemplary solid state image sensor compatible with the two systems is illustrated in FIG. 1. This solid state image sensor comprises an imaging region 1 consisting of a matrix of photosensitive elements (not shown) and a plurality of vertical shift registers (not shown) disposed adjacent to columns of said photosensitive elements and corresponding to an aspect ratio of 16:9, three horizontal shift registers 5, 6, 7 and three buffer amplifiers 8, 9 and 10 connected to said horizontal shift registers 5, 6 and 7, respectively. The imaging region 1 is divided into three segments, viz. a first segment 2 corresponding to an aspect ratio of 4:3, a second segment 3 and a third segment 4 which are not required for said aspect ratio of 4:3 but are required for said aspect ratio of 16:9, and the three horizontal shift registers 5, 6 and 7 are disposed in correspondence with said segments 2, 3 and 4, respectively. Indicated by A1, A2, A3 and A4 are terminals for supplying driving pulses to transfer gate electrodes of the vertical shift registers. The arrowmarks indicate the direction of flow of signal charges.

The method of driving the above solid state image sensor is now described.

For both aspect ratios of 4:3 and 16:9, signal charges are read out from the imaging region 1 to the vertical shift registers in the first place. Then, vertical transfer signals are applied to the vertical shift registers from terminals A1–A4 to transfer the signal charges accumulated in the groups of photosensitive elements in said first segment 2, second segment 3 and third segment 4 to said first horizontal shift register 5, second horizontal shift register 6 and third horizontal shift register 7, respectively. Then, horizontal transfer pulses are applied to the respective horizontal shift registers to transfer the signal charges therein to the corresponding buffer amplifiers 8, 9 and 10 to thereby output picture signals. In the described arrangement, a picture signal corresponding to the aspect ratio of 4:3 is available from the buffer amplifier 8 and a picture signal for the aspect ratio of 16:9 is obtained by superimposing the signal outputs of the buffer amplifiers 8, 9 and 10 in an external circuit.

However, this prior art solid state image sensor is complicated in construction because each of the horizontal transfer and buffer amplifier stages has been divided into three segments. Moreover, in order to obtain a picture signal corresponding to an aspect ratio of 16:9, signal outputs of the three buffer amplifiers must be superimposed and this requirement adds complexity to the signal processing and driving circuitry.

SUMMARY OF THE INVENTION

The object of the present invention is to provide a solid state image sensor device compatible with at least two different aspect ratios, from which a picture signal corresponding to each of the aspect ratios can be easily read out, and a method of driving the image sensor device.

The solid state image sensor device of the invention comprises, in one embodiment thereof, a matrix of photosensitive elements adapted to accumulate signal charges corresponding to at least two different aspect ratios, a plurality of vertical shift registers disposed adjacent to columns of said photosensitive elements and adapted to transfer said signal charges in a vertical direction and a plurality of horizontal shift registers corresponding to each of said aspect ratios and disposed in parallel with each other. By providing horizontal shift registers each exclusive to each of different aspect ratios in this manner, it is no longer necessary to superimpose the signal outputs of a plurality of buffer amplifiers, with the result that a picture signal for the desired aspect ratio can be easily obtained.

The solid state image sensor device of the invention, in another embodiment, comprises a matrix of photosensitive elements adapted to accumulate signal charges corresponding to at least two different aspect ratios, a plurality of vertical shift registers disposed adjacent to columns of said photosensitive elements and adapted to transfer said signal charges in a vertical direction, a storage region for storing signal charges from said vertical shift registers for a while and, then, transferring them in a vertical direction and a horizontal shift register for transferring the signal charges received from said storage region in a horizontal direction, said storage region comprising a group of transfer gate electrodes of which either the last transfer gate electrode or a plurality of transfer gate electrodes including said last gate electrode are electrically independent of the remainder of transfer gate electrodes. By making at least the last transfer gate electrode electrically independent of the other electrodes in the storage region, the signal charges in the storage region which are unnecessary for the reading of the picture signal corresponding to an aspect ratio of 4:3, for instance, can be transferred at a high speed so that the picture signal with an aspect ratio of 4:3 can be easily read out without resort to the division of the horizontal shift register stage.

The method of the invention for driving a solid state image sensor device, in one embodiment thereof, comprises a step of reading signal charges from a matrix of photosensitive elements adapted to accumulate signal charges corresponding to at least two different aspect ratios to vertical shift registers, a step of selecting one horizontal shift register from among the horizontal shift registers corresponding to said respective aspect ratios and transferring the signal charges to the selected horizontal shift register and a step of transferring signal charges from said horizontal shift register to a buffer amplifier.

The method of the invention for driving the solid state image sensor, in another embodiment, comprises a step of transferring signal charges corresponding to at least two different aspect ratios as accumulated in a matrix of photosensitive elements to a horizontal shift register through a plurality of vertical shift registers disposed adjacent to columns of said photosensitive elements, a step of applying a high-speed transfer pulse to the horizontal shift register within a horizontal blanking interval to sweep signal charges not required for any aspect ratio smaller than the maximum picture size and a step of transferring signal charges necessary for said aspect ratio smaller than the maximum picture size.

The method of the invention for driving a solid state image sensor, in another embodiment, comprises a step of transferring signal charges corresponding to at least two aspect ratios as accumulated in a matrix of photosensitive elements to a storage region comprising a group of transfer gate electrodes of which either the last transfer gate electrode or a plurality of transfer gate electrodes including said last transfer gate electrodes are electically independent of the remainder of transfer gate electrodes, a step of applying a high-speed driving pulse to said last transfer gate electrode or said plurality of transfer gate electrodes including the last transfer gate electrode to transfer signal charges from said storage region to said horizontal shift register, the width of said high-speed driving pulse being narrower than the width of driving pulse to be applied to said remainder of transfer gate electrodes, and a step of transferring signal charges from said horizontal shift register to a buffer amplifier.

In these driving methods, it is no longer necessary to superimpose the signal outputs of a plurality of buffer amplifiers for reading out a picture signal corresponding to the desired aspect ratio, with the result that the picture signal corresponding to the desired aspect ratio can be easily obtained.

DETAILED DESCRIPTION OF THE PREFERRED EMBODIMENTS

Embodiment 1

Figure 1:
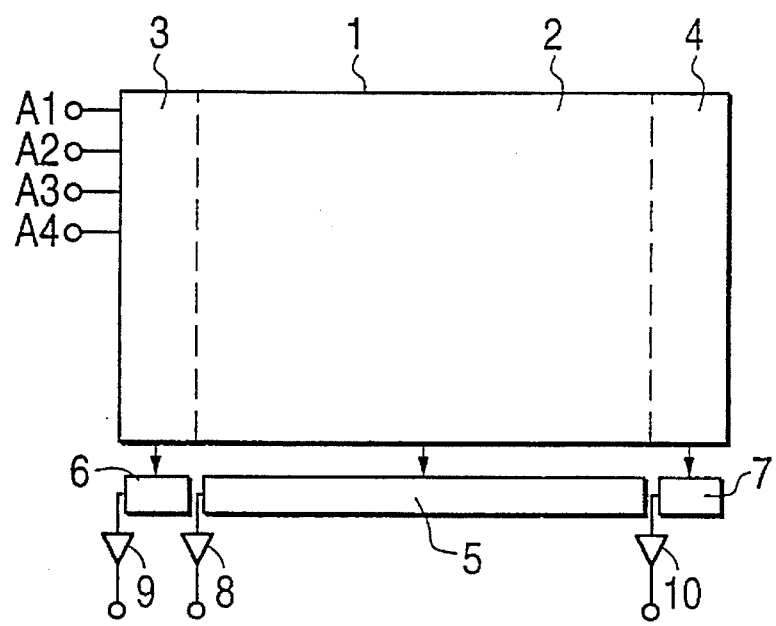
FIG. 1 shows the construction, in plan view, of the conventional solid state image sensor.
Figure 2:
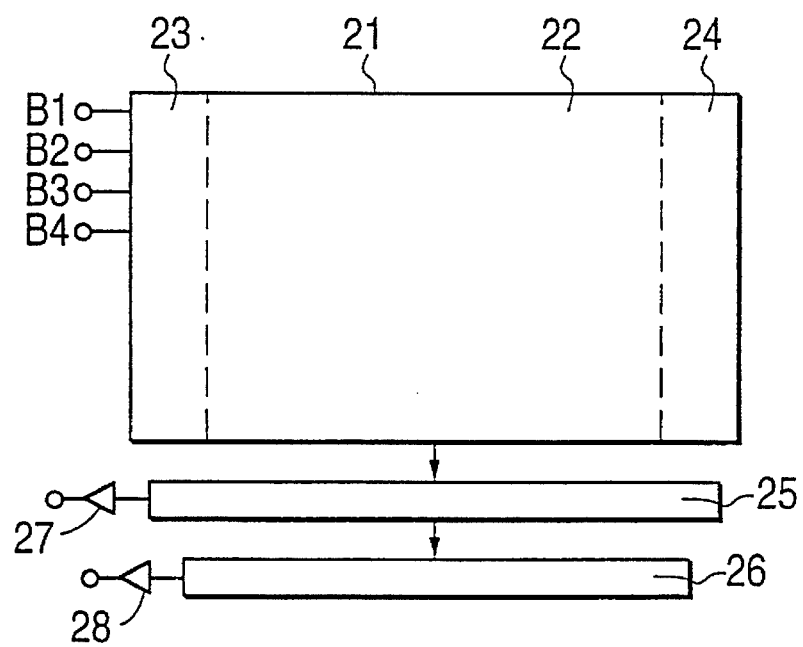
FIG. 2 shows the construction, in plan view, of a solid state image sensor according to Embodiment 1.

Referring to FIG. 2, which is a schematic diagram showing the solid state image sensor according to Embodiment 1 which is compatible with the two television systems having aspect ratios of 16:9 and 4:3, this solid image sensor comprises an imaging region 21, a couple of horizontal shift registers 25, 26 for a horizontal transfer of signal charges vertically read out from said imaging region 21, and a couple of buffer amplifiers 27, 28 connected to said respective horizontal shift registers 25, 26.

Figure 3:
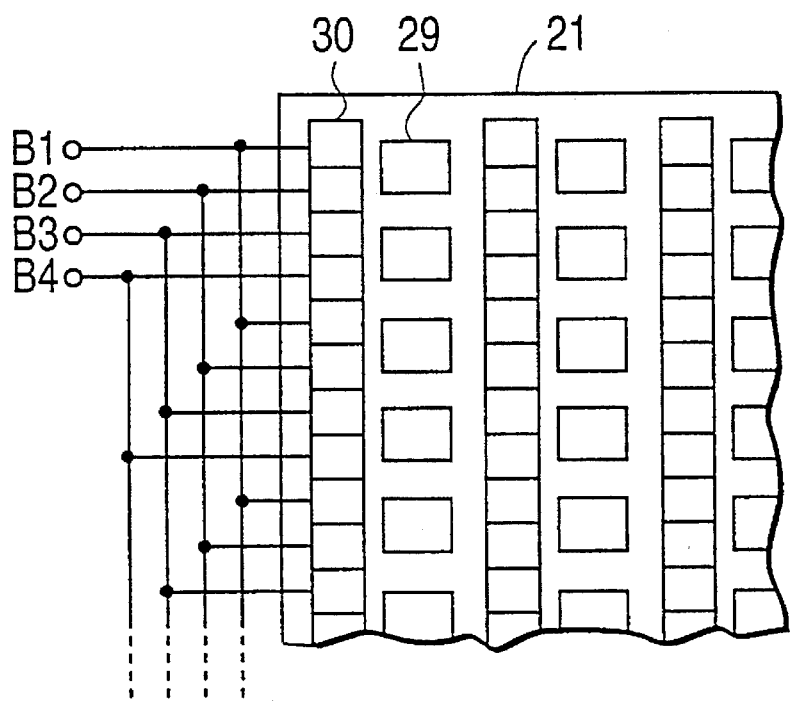
FIG. 3 is a partial view, on exaggerated scale, of the above construction.

The imaging region 21, as shown in FIG. 3, comprises a matrix of photosensitive elements 29 for accumulating signal charges and vertical shift registers 30 disposed adjacent to columns of said photosensitive elements 29. The photosensitive elements 29 constitute a matrix consisting of 948 column and 486 rows. The vertical shift registers 30 are disposed in 948 columns, each of which comprises transfer gate electrodes in 972 stages. The signal charges accumulated in the entire imaging region 21 are utilized for reading the picture signal corresponding to the aspect ratio of 16:9 and the signal charges accumulated in a first segment 22 situated centrally in the imaging region 21 are utilized for reading the picture signal corresponding to the aspect ratio of 4:3. The first segment 22 corresponds to 710 columns of said photosensitive elements 29 and vertical shift registers 30. The second segment 23 and third segment 24 at both ends are the region which is not required for the aspect ratio of 4:3. Indicated by B1, B2, B3 and B4 are terminals for supplying vertical transfer pulses to the transfer gate electrodes of said vertical shift registers 30.

The horizontal shift register 25, adapted to transfer signal charges from the entire imaging region 21, is used for the aspect ratio of 16:9. The horizontal shift register 26 for transferring the signal charges from the first segment 22 is used for the aspect ratio of 4:3.

Buffer amplifiers 27, 28 convert signal charges from the horizontal shift registers 25 and 26, respectively, to picture signals.

The arrowmarks indicate the direction of flow of signal charges.

In order to read a picture signal corresponding to the aspect ratio of 16:9, the signal charges accumulated in photosensitive elements 29 are read out to the vertical shift registers 30 and, then, vertical transfer pulses are applied to terminals B1–B4 to transfer the signal charges in a vertical direction. These signal charges are then transferred sequentially, row by row, to the horizontal shift register 25, and in response to a horizontal transfer pulse, are further transferred to the buffer amplifier 27 which, accordingly, outputs the picture signal corresponding to the aspect ratio of 16:9. In this arrangement, the horizontal shift registers 25 and 26 must be electrically independent of each other.

A picture signal corresponding to the aspect ratio of 4:3 can be obtained as follows. Thus, among the signal charges read out from the imaging region 21, only the charges from the first segment 22 are transferred to the horizontal shift register 26. These signal charges are then transferred by a horizontal transfer pulse to the buffer amplifier 28 which, accordingly, outputs the picture signal corresponding to the aspect ratio of 4:3. In this mode, signal charges from the second segment 23 and third segment 24 remain in the horizontal shift register 25 but these unnecessary charges can be swept while the transfer of signal charges by the horizontal shift register 26 is in progress.

By providing exclusive horizontal shift registers 25 and 26 for different aspect ratios in the described manner, a picture signal corresponding to the desired aspect ratio can be easily obtained without resort to a complicated external circuit for superimposition of the signal outputs of plural buffer amplifiers.

The above description is directed to a solid state image sensor device comprising an imaging region and horizontal shift registers as main components but the concept of providing a horizontal shift register for each aspect ratio is applicable to a solid state image sensor of the progressive scan type including a storage region interposed between an imaging region and a horizontal shift register stage for temporary storage of signal charges from the imaging region.

Moreover, although the above description pertains to the image sensor including a horizontal shift register 25 for the aspect ratio of 16:9 and a horizontal shift register 26 for the aspect ratio of 4:3, there can be provided a solid state image sensor compatible with other aspect ratios by modifying the horizontal shift register 26.

In addition, although an image sensor having two horizontal shift registers-has been described above, three or more horizontal shift registers can be installed within limits allowable from the consideration of transfer efficiency.

Embodiment 2

Figure 4:
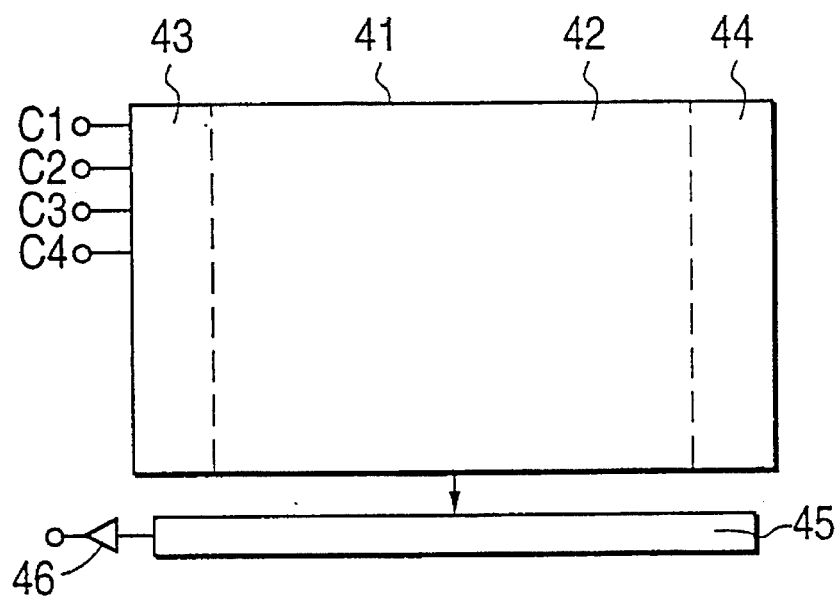
FIG. 4 shows the construction, in plan view, of a solid state image sensor according to Embodiment 2.

The solid state image sensor illustrated in FIG. 4 is also compatible with two television systems having aspect ratios of 16:9 and 4:3, respectively. The imaging region 41 comprising a first segment 42, a second segment 43 and a third segment 44 is identical to the imaging region 21 of Embodiment 1. Terminals C1, C2, C3 and C4 supply driving pulses to the transfer gate electrodes of vertical shift registers (not shown). This embodiment is different from Embodiment 1 in that one horizontal shift register 45 and one buffer amplifier 46 are employed. The arrowmarks indicate the direction of flow of signal charges.

The method of driving the above solid state image sensor for reading a picture signal corresponding to an aspect ratio of 16:9 is now described.

Figure 5:
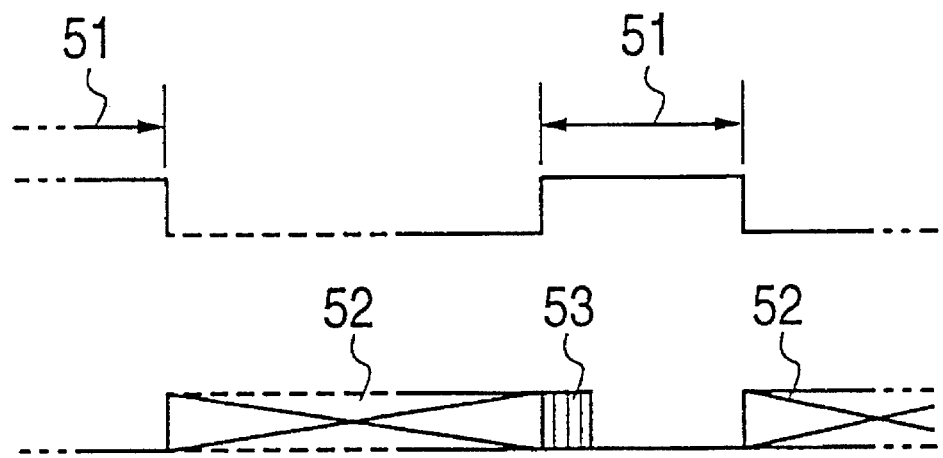
FIG. 5 and FIG. 6 show the driving signals for reading out picture signals corresponding to the aspect ratios of 16:9 and 4:3, respectively, from the same solid state image sensor.

First, signal charges accumulated in the photosensitive elements (not shown) in the imaging region 41 are read out to vertical shift registers (not shown). Then, vertical transfer pulses are supplied from terminals C1–C4 so as to transfer the signal charges to a horizontal shift register 45. As shown in FIG. 5, one row of signal charges transferred to this horizontal shift register 45 are further transferred by a horizontal transfer pulse 52 to a buffer amplifier 46 which, accordingly, outputs a picture signal. Then, as the horizontal blanking interval begins as indicated by 51, signal charges are read from the photosensitive elements in the optical black region (not shown) to the horizontal shift register 46 and, by an OB transfer pulse 53, these signal charges are transferred to the buffer amplifier 46, with the result that a signal corresponding to optical black is outputted from the buffer amplifier 46. Then, the next column equivalent of signal charges are read out to the horizontal shift register 45 and as the horizontal blanking interval 51 ends, these signals are transferred likewise to the horizontal shift register 45, whereupon the buffer amplifier 46 outputs the corresponding picture signal.

As the above series of steps is repeated, all the signal charges read out from the imaging region 41 are transferred to provide a picture signal corresponding to the aspect ratio of 16:9. Generally, a picture signal for A field is constituted by the above series of steps and, then, a picture signal for B field is constituted by repeating the above procedure for use as picture signals for an interlaced scan system. To read out a picture signal corresponding to the aspect ratio of 4:3, the signal changes read out from photosensitive elements in the imaging region 41 to the vertical shift registers in the same manner as above are transferred by vertical transfer pulses applied from terminals C1–C4.

Figure 6:
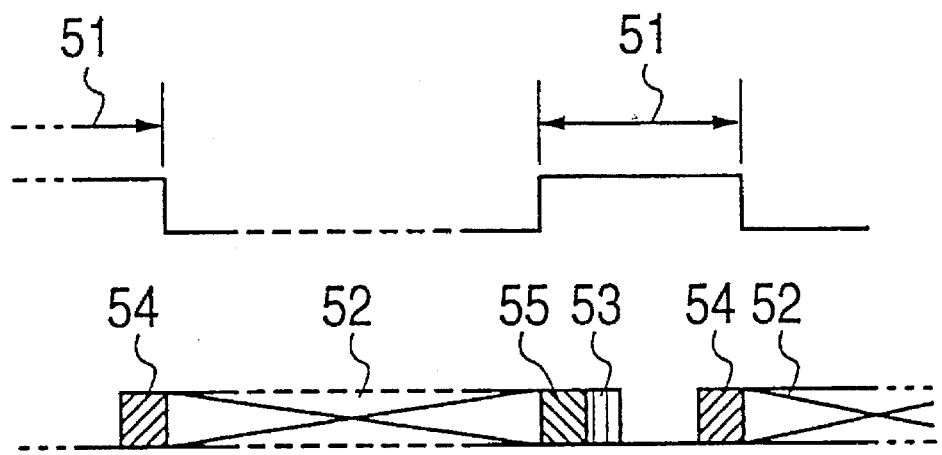

In the horizontal shift register 45, as shown in FIG. 6, the signal charges from the second segment 43, corresponding to one row, are transferred at a high speed, on application of a high-speed transfer pulse 54, before termination of the horizontal blanking interval 51. These signal charges are unnecessary for the constitution of a picture signal corresponding to the aspect ratio of 4:3 and, therefore, discarded. Then, as the horizontal blanking interval 51 ends, the signal charges from the first segment 42 are transferred horizontally by a horizontal transfer pulse 52 and the buffer amplifier 46 outputs the corresponding picture signal. Then, in the next horizontal blanking interval 51, signal charges from the third segment 44 are transferred at a high speed by a second high-speed transfer pulse 55. These signals are unnecessary for the picture signal corresponding to the aspect ratio of 4:3 and, therefore, discarded. Then, signal charges in the optical black region (not shown) are transferred to the horizontal buffer register 45, from which they are transferred by an OB transfer pulse 53 to the buffer amplifier 46, with the result that the signal corresponding to optical black is outputted from the buffer amplifier 46. Before the horizontal blanking interval 51 ends, the next row of signal charges are read out to the horizontal shift resister 45 and the signal charges from the second segment 43 are transferred at a high speed by the first high-speed transfer pulse 54. As this series of steps is repeated, all the signal charges from the first segment 42 are read out to generate a picture signal corresponding to the aspect ratio of 4:3. Generally a picture signal for A field is constituted by the above series of steps and a picture signal for B field is then constituted by repeating the above procedure for use as picture signals for an interlaced scan system.

Thus, by applying the first high-speed and second high-speed transfer pulses within the horizontal blanking interval 51, the signal charges unnecessary for the aspect ratio of 4:3 from the second and third segments 43, 44 can be transferred during the horizontal blanking interval 51 and only the picture signal corresponding to the aspect ratio of 4:3 can be read out from the buffer amplifier 46.

While the above description was directed to the method of driving a solid state image sensor comprising an imaging region and a horizontal shift register as main components, this driving method can be applied to a solid state image sensor of the interlaced scan type including a storage region interposed between the imaging region and the horizontal shift register for temporary storage of signal charges from the imaging region.

Moreover, while the above description pertains to the case in which a picture signal corresponding to an aspect ratio of 4:3 is read out from a solid state image sensor compatible with an aspect ratio of 16:9, this embodiment is not limited to the above case but a picture signal corresponding to any desired aspect ratio can be obtained by changing the breadth of said first and second high-speed transfer pulses.

In addition, the above description is relevant to the case in which a required picture signal corresponding to an aspect ratio which is smaller than the maximum picture frame is taken out by trimming the head and tail portions of the signal charges corresponding to the maximum picture frame, either the head portion only or the tail portion only may be trimmed in otherwise the same manner.

Embodiment 3

Figure 7:
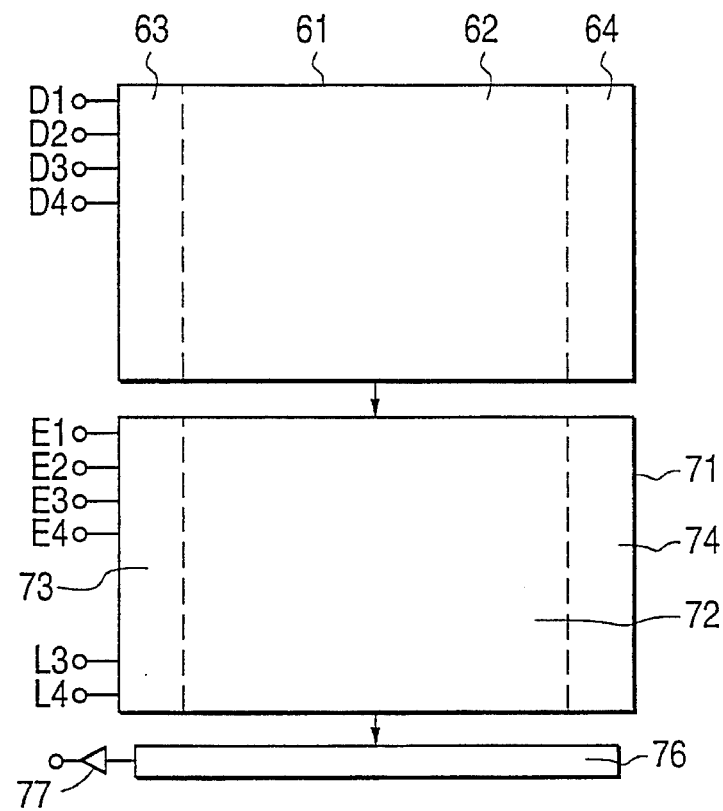
FIG. 7 shows the construction, in plan view, of the solid state image sensor according to Embodiment 3 of the invention.
Figure 8:
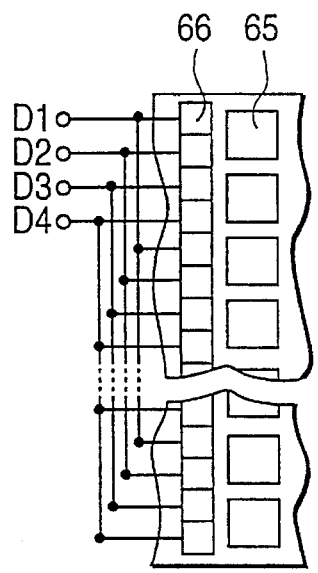
FIG. 8 is a diagram showing one column of photosensitive elements of the imaging region and the corresponding vertical shift register.

Referring to FIG. 7 which is a schematic view showing another solid state image sensor compatible with two television systems with aspect ratios of 16:9 and 4:3, respectively, this solid state image sensor comprises an imaging region 61, a storage region 71 for temporary storage of signal charges from said imaging region 61, a horizontal shift register 76 for a horizontal transfer of signal charges from said storage region 71 and a buffer amplifier 77 connected to said horizontal shift register 76. As shown in FIG. 8, the imaging region 61 comprises a matrix of photosensitive elements 65 for accumulating signal charges and vertical shift registers 66 disposed adjacent to columns of said photosensitive elements 65. However, only one column of photosensitive elements 65 and the corresponding one vertical shift register 66 are shown in FIG. 8. The photosensitive elements 65 are arranged in 948 columns and 486 rows. The vertical shift registers 66 are disposed in 948 columns, each of which comprises transfer gate electrodes in 972 stages. To read a picture signal with an aspect ratio of 16:9, the signal charges accumulated in the entire imaging region 61 are utilized. For a picture signal corresponding to an aspect ratio of 4:3, the signal charges accumulated in the central first segment 62 of the imaging region 61 are utilized.

The first segment 62 corresponds to 710 columns of said photosensitive elements 65 and vertical shift registers 66. The second segment 63 and third segment 64 at both ends are not required for the aspect ratio of 4:3. Terminals D1, D2, D3 and D4 supply driving pulses to the transfer gate electrodes of the vertical shift registers 66.

Figure 9:
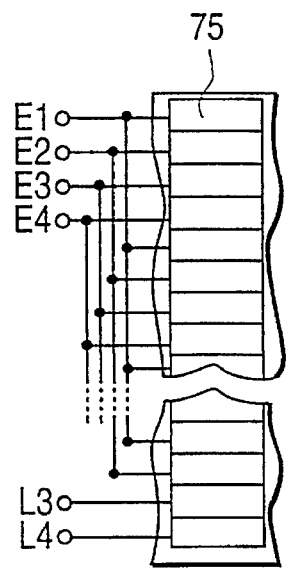
FIG. 9 is a diagram showing one column of transfer gate electrodes in the storage region.

The storage region 71 comprises transfer gate electrodes in 972 stages corresponding to the imaging region 61 and has a structure consisting of 948 columns of the vertical shift register 75 illustrated in FIG. 9. The vertical shift register 75 has a function to temporarily store the signal charges and a function to transfer the signal charges in the vertical direction. The storage region 71 has a first segment 72, a second segment 73 and a third segment 74 corresponding to the first segment 62, second segment 63 and third segment 64, respectively, of the imaging region 61. Indicated by E1, E2, E3 and E4 are terminals for supplying driving pulses to the transfer gate electrodes of the vertical shift register 75. However, unlike the case with the imaging region 61, a terminal L4 for the last transfer gate electrode and another terminal L3 for the immediately preceding transfer gate electrode, both of which are electrically independent of terminals E1–E4, are provided so that said last transfer gate electrode and immediately preceding transfer gate electrode may be supplied with driving pulses independently of the other transfer gate electrodes.

The arrowmarks indicate the direction of flow of signal charges.

Figure 10:
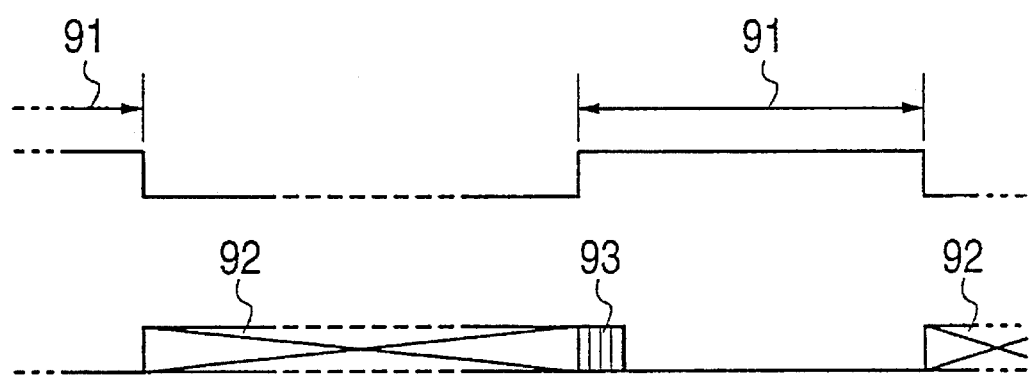
FIGS. 10 and 11 are timing charts illustrating the driving modes for reading the picture signals corresponding to the aspect ratios of 16:9 and 4:9 from the same solid state image sensor.

The method of driving this solid state image sensor for reading a picture signal corresponding to an aspect ratio of 16:9 is now described with reference to FIG. 10.

First, signal charges are read out from photosensitive elements 65 in the imaging region 61 to the vertical shift registers 66 and, then, vertical transfer pulses are applied from terminals D1–D4 so as to transfer said signal charges to the storage region 71. In the storage region 71, signal charges are transferred by the vertical transfer pulses applied to terminals E1–E4. In this manner, signal charges from all the photosensitive elements 65 are stored in the storage region 71. As shown in FIG. 10, one row equivalent of the signal charges stored in the storage region 71 are transferred to the horizontal shift register 76, from which they are transferred by a horizontal transfer pulse 92 to the buffer amplifier 77 which, accordingly, outputs a picture signal corresponding to an aspect ratio of 16:9. Then, in the next horizontal blanking interval 91, signal charges from the photosensitive elements in the optical black region (not shown) are read out to the horizontal shift register 76. These signal charges are then transferred by an OB transfer pulse 93 to the buffer amplifier 77 so that a signal corresponding to optical black is outputted from the buffer amplifier 77. Then, the next one row equivalent of signal charges are read out to the horizontal shift register 76 and the corresponding picture signal is obtained from the buffer amplifier 77 in the same manner.

For reading the picture signal corresponding to the aspect ratio of 16:9, driving signals independent of those applied to E1–E4 may be supplied to the terminals L3 and L4 shown in FIG. 9 or as an alternative, the terminals L3 and L4 may be connected to E3 and E4, respectively.

Figure 11:
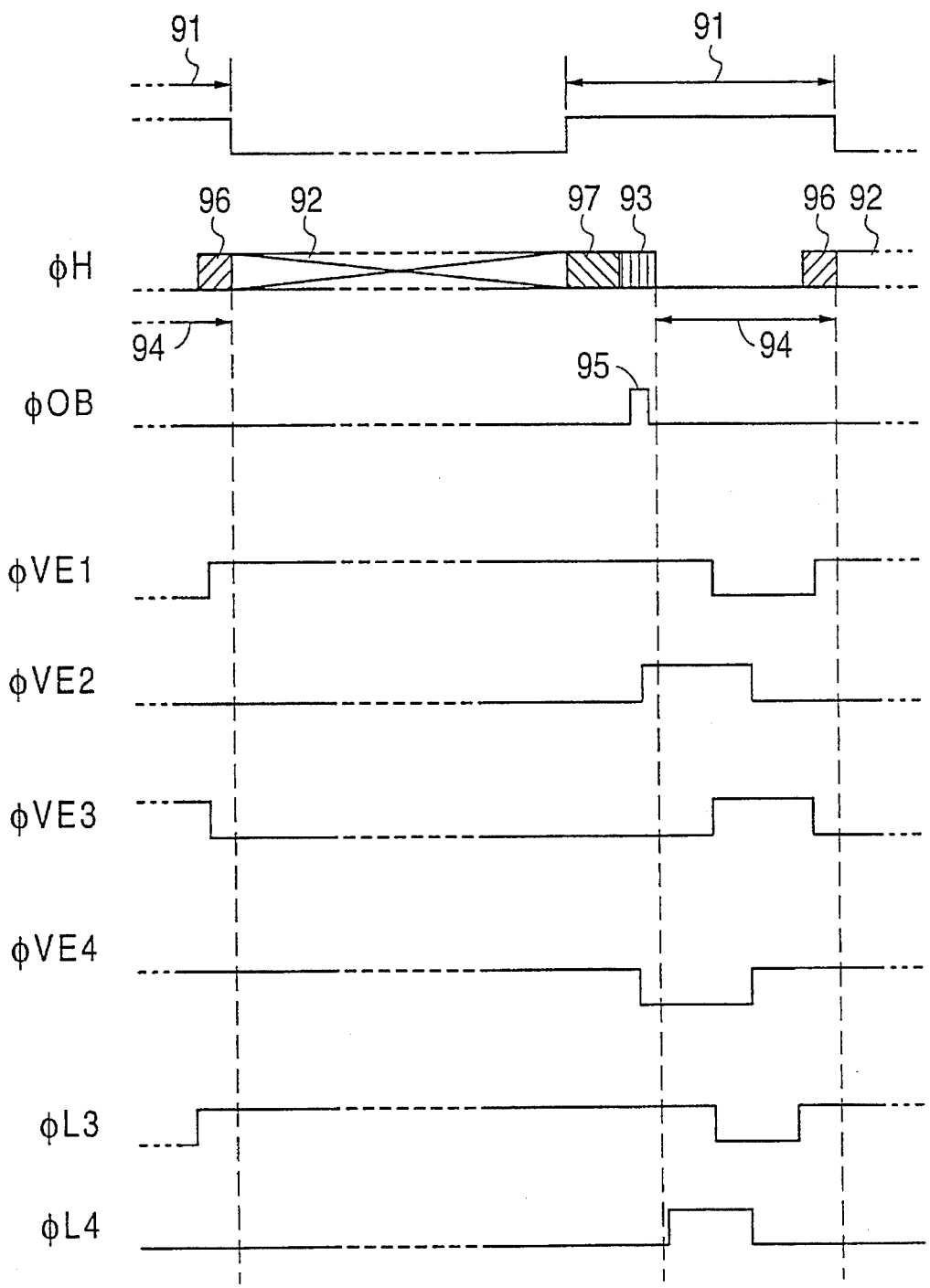

The driving method for reading the picture signal corresponding to an aspect ratio of 4:3 is now described with reference to FIG. 11.

To read the picture signal corresponding to an aspect ratio of 4:3, signal charges from all the photosensitive elements are first stored in the storage region just as described hereinbefore. These signal charges are then read out by the driving pulses shown in FIG. 11. However, unlike the case with the aspect ratio of 16:9, the signal charges in the second segment 73 and third segment 74 which are not required for the television system with an aspect ratio of 4:3, must be swept out during the horizontal blanking interval.

First, during a horizontal blanking interval 91, one row equivalent of signal charges in the storage region 71 are read out to the horizontal shift register 76 and transferred by a driving pulse $\phi H$. Thus, before the horizontal blanking interval 91 ends, signal charges from the second segment 73 of the storage region 71 are swept by a first sweeping pulse 96. As the horizontal blanking interval 91 ends, a horizontal transfer pulse 92 is applied for a horizontal transfer of signal charges from the first segment 72 of the storage region 71 so that the buffer amplifier 77 outputs a picture signal corresponding to an aspect ratio of 4:3. Then, the next horizontal blanking interval 91 begins, a second sweeping pulse 97 sweeps signal charges from the third segment 74 of the storage region 71. Then, the level of the optical black region (not shown) is locked with an OB locking pulse 95 of $\phi OB$ and this OB signal is transferred by an OB transfer pulse 93 and outputted from the buffer amplifier 77.

By repeating the above series of steps to read signal charges from the first segment 72 of storage region 71 and output them, a picture signal corresponding to an aspect ratio of 4:3 can be obtained.

Within a time slot 94 of the horizontal blanking interval 91, $\phi VE1$ and $\phi VE3$ are applied to the vertical shift registers 75 of the storage region 71 to transfer the signal charges from the imaging region 61 and during the period between the OB transfer pulse 93 and the first sweeping pulse 96, signal charges are transferred from the storage region 71 to the horizontal shift register 76 by high-speed driving pulses having narrower pulse width $\phi L3$ and $\phi L4$.

It should be understood that although the driving pulses $\phi L3$ and $\phi L4$ must be applied while the horizontal shift register 76 is at rest, $\phi VE1$ and $\phi VE3$ may be applied at any time within the time slot 94.

Thus, by insuring the electrical independence of the last transfer gate electrode or the transfer gate electrodes including the last transfer electrode from the remainder of transfer gate electrodes and applying high-speed driving pulses in the above manner, signal charges unnecessary for a picture signal corresponding to an aspect ratio of 4:3 can be swept out at a high speed to the horizontal shift register 76, with the result that the picture signal with all aspect ratio of 4:3 call be easily read out from a solid state image sensor compatible with a television system with an aspect ratio of 16.9.

In addition to the specific Embodiments described hereinabove, one skilled in the art may contrive a variety of modifications of the invention without departing from the spirit and scope of the invention. For example, although the solid state image sensors described in the foregoing description are compatible with the two aspect ratios of 16:9 and 4:3, solid state image sensors compatible with three or more different aspect ratios are also subsumed in the claimed category of solid state image sensor compatible with a plurality of aspect ratios. Furthermore, the buffer amplifier need not necessarily be disposed within the solid state image sensor but may be disposed externally of the image sensor.

Therefore, any and all modifications falling within the true spirit and ambit of the invention should be regarded as being fully covered by the claimed invention.

What is claimed is:

1. A solid state image sensor comprising a matrix of photosensitive elements having a first image segment adapted to accumulate first signal charges corresponding to a first aspect ratio and a second image segment adapted to accumulate second signal charges corresponding to a second aspect ratio, wherein said second image segment is included within said first image segment and is situated centrally in said first image segment, a plurality of vertical shift registers disposed adjacent to columns of said photosensitive elements for a vertical transfer of said first signal charges including said second signal charges, a first horizontal shift register corresponding to said first aspect ratio adapted to accept said first signal charges from said vertical shift registers, said first horizontal shift register disposed under said first image segment, and a second horizontal shift register corresponding to said second aspect ratio adapted to accept only said second signal charges from said first horizontal shift register, said second horizontal shift register having the same number of transfer stages as the number of said photosensitive elements in one row of said second image segment, disposed in parallel with said first horizontal shift register, and disposed just under said second image segment through said first horizontal shift register.

2. The solid state image sensor of claim 1 wherein said first and second aspect ratios are 16:9 and 4:3, respectively.

3. A method of driving a solid state image sensor which comprises a step of reading first signal charges corresponding to a first aspect ratio including second signal charges corresponding to a second aspect ratio from a first image segment of a matrix of photosensitive elements adapted to accumulate said first signal charges to vertical shift registers, said second signal charges accumulated in a second image segment situated centrally in said first image segments, a step of transferring said first signal charges from said vertical shift registers to a first horizontal shift register which is disposed under said first image segment, a step of transferring horizontally said first signal charges to a first buffer amplifier, when reading out said first signal charges, and a step of transferring only said second signal charges included in said first signal charges without horizontal transfer in said first horizontal shift register from said first horizontal shift register to a second horizontal shift register, and transferring horizontally said second signal charges to a second buffer amplifier, when reading out said second signal charges, said second horizontal shift register having the same number of transfer stages as the number of said photosensitive elements in one row of said second image segment, disposed in parallel with said first horizontal shift register, and disposed just under said second image segment through said first horizontal shift register.

4. The method of driving a solid state image sensor as claimed in claim 3 wherein said first and second aspect ratios are 16:9 and 4:3, respectively.

5. A method of driving a solid state image sensor which comprises a step of reading first signal charges corresponding to a first aspect ratio including second signal charges corresponding to a second aspect ratio from a first image segment of a matrix of photosensitive elements adapted to accumulate said first signal charges to vertical shift registers, said second signal charges accumulated in a second image segment situated centrally in said first image segment, a step of transferring said first signal charges from said vertical shift registers to a storage region, said storage region comprising a first storage segment to store said first signal charges, a second storage segment to store said second signal charges situated centrally in said first storage segment, and a group of transfer gate electrodes wherein either the last transfer gate electrode or a plurality of transfer gate electrodes including said last transfer gate electrode are electrically independent of the remainder of transfer gate electrodes, a step of applying a high-speed driving pulse to either said last transfer gate electrode or said plurality of transfer gate electrodes including said last transfer gate electrode, the width of said high-speed driving pulse being narrower than the width of driving pulses to be applied to said remainder of transfer gate electrodes, to thereby transfer said first signal charges from said first storage segment to a horizontal shift register, a step of applying a first high-speed transfer pulse to said horizontal shift register during a horizontal blanking interval to sweep a first unnecessary signal charges included said first signal charges when reading out said second signal charges, said first unnecessary signal charges stored in one of two segments situated in both sides of said second storage segment, a step of transferring said second signal charges from said horizontal shift register to a buffer amplifier after sweeping said first unnecessary signal charges, and a step of applying a second high-speed transfer pulse to said horizontal shift register during the next horizontal blanking interval to sweep a second unnecessary signal charges included said first signal charges after transferring said second signal charges to said buffer amplifier, said second unnecessary signal charges stored in the other.

6. The method of driving a solid state image sensor as claimed in claim 5 wherein said first and second aspect ratios are 16:9 and 4:3, respectively.

* * * * *